United States Patent [19]

Aubin

[11] Patent Number: 4,658,427

[45] Date of Patent: Apr. 14, 1987

[54] SOUND PRODUCTION DEVICE

[75] Inventor: Sylvain Aubin, Paris, France

[73] Assignee: Etat Francais represente per le Ministre des PTT (Centre National d'Etudes des Telecommunications), Issy les Moulineaux, France

[21] Appl. No.: 641,960

[22] PCT Filed: Dec. 8, 1983

[86] PCT No.: PCT/FR83/00247

§ 371 Date: Aug. 2, 1984

§ 102(e) Date: Aug. 2, 1984

[87] PCT Pub. No.: WO84/02416

PCT Pub. Date: Jun. 21, 1984

[30] Foreign Application Priority Data

Dec. 10, 1982 [FR] France ................................ 82 20695

[51] Int. Cl.[4] ................................................ H04N 7/18

[52] U.S. Cl. ...................................... 381/124; 358/94; 84/DIG. 6

[58] Field of Search .................. 381/124, 61; 358/105, 358/107, 903, 94; 84/1.18, DIG. 6; 340/384 R, 384 E; 434/116

[56] References Cited

U.S. PATENT DOCUMENTS 3,907,434 9/1975 Coles .................................... 358/94
4,000,565 1/1977 Overby ................................ 358/94
4,127,049 11/1978 Ichigaya ......................... 84/DIG. 6
4,215,343 7/1980 Ejiri .................................. 84/DIG. 6
4,322,744 3/1982 Stanton ................................ 358/94
4,378,569 3/1983 Dallas, Jr. ............................ 358/94
4,483,230 11/1984 Yamauchi ............................ 84/1.18

FOREIGN PATENT DOCUMENTS 2511935 3/1975 Fed. Rep. of Germany ........ 358/94
8200395 2/1982 World Int. Prop. O. ............ 358/94

OTHER PUBLICATIONS

Fish, R., "An Audio Display for the Blind," *IEEE Transactions on Biomedical Engineering*, vol. BME 23, No. 2, Mar. 1976, pp. 144–154.

*Primary Examiner*—Gene Z. Rubinson
*Assistant Examiner*—L. C. Schroeder
*Attorney, Agent, or Firm*—Bucknam and Archer

[57] ABSTRACT

A sound production device has at least one generator for producing a video signal and an analog-to-digital converter if the video signal is not already digital. The video is converted to a plurality p of signals which are representative of P parameters. The device also has a set of digital-to-analog converters equal in number to the number of parameters and a matrix for connecting the P signals to a second plurality of q inputs of a sound synthesizer, the output of which is connected to a loudspeaker.

11 Claims, 5 Drawing Figures

SOUND PRODUCTION DEVICE

BACKGROUND OF THE INVENTION

This invention relates to a method and a device for sound production involving conversion of images to sounds, which makes it possible to analyze images including at least one moving object and to produce musical sounds from this analysis.

The invention is thus directed to a method of sound production which essentially consists:

in observing an image which includes a moving object, in producing image signals representing at least two parameters of the image which vary during displacement of the object, in producing sound control signals from said image signals and achieving sound synthesis by utilizing said sound control signals for controlling the variations of at least two different parameters of the sounds produced.

BRIEF SUMMARY OF THE INVENTION

The invention also has for its object a sound production device which is characterized in that it comprises first means for observing an image which includes a moving object and producing image signals representing at least two parameters of the image which vary during displacement of the object, and second means for producing sound control signals from said image signals and for achieving sound synthesis by utilizing said sound control signals for controlling the variations of at least two different parameters of the sounds produced.

In a device of this type, the first means can advantageously comprise a video signal generator for producing the image signals. Furthermore, the second means can advantageously be designed to control parameters of sounds selected from the pitch of the sound, its tonal quality, its intensity and possibly the frequency of succession of sounds or their duration, or any combination of these parameters.

It is in fact already known to construct devices for the synthesis of noises or sounds which are operated for example by means of voice control as described in French Pat. No. 2 057 645, or which make use of a music analyzer for generating control signals of a sound synthesizer as in French Pat. No. 2 226 092. There has also been disclosed in French Pat. No. 2 206 030 a system for subjecting the production of sounds to the influence of energy displacement of a human being. However, the aforementioned documents are not concerned in any single instance with the use of images for generating video signals in order to control a sound synthesizer after conversion of these signals. The movements cannot really be processed by any of the known techniques whereas this is permitted by the invention since it offers the possibility of applying an analysis of the image in sound synthesis which can thus be influenced for example by any particular movement of an arm, leg, body or the like of a dancer or of a group of persons. It will further be noted that, on the basis of a detailed image analysis, it is possible to control a number of important parameters in sound synthesis by utilizing relations between physical parameters and qualities of sounds which are known per se.

In a particular form of embodiment, the invention involves the use of a device for converting a video signal to sounds, comprising at least one video signal generator, an analog-to-digital converter if the video signal is not already digital, a means for converting the digitized video signal to a plurality p of signals which are representative of P parameters, a set of analog-to-digital converters equal in number to the number of parameters, a matrix for connecting the P signals to a second plurality of q inputs of a sound synthesizer, the output of which is connected to a loudspeaker.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
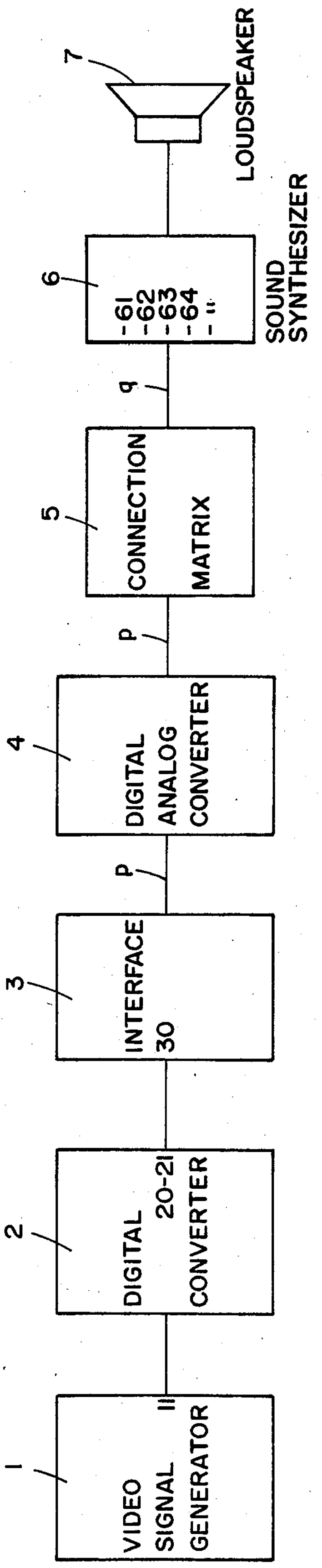
FIG. 1 is a block diagram of the constituent elements of an embodiment of the device of the invention.

FIG. 1 illustrates the device of the invention, in which a video signal generator 1 may be constituted, as will become apparent hereinafter, by one or a number of black-and-white or color video cameras, or by a video tape recorder, a videodisk, or any other means. Except in the case of the videodisk, the video signals delivered by the means 1 are not usually in digital form. From the generator output 11, they accordingly supply an analog-to-digital converter 2 (input 20) which converts the analog signals to digital signals in order to transmit them from its output 21 to the input 30 of an interface 3, which can be constituted either by a microprocessor device, or by a wired logic which will be described hereinafter. Should the video signal be produced in digital form at the outset, it would be admitted directly to the interface 3. The plurality p of P outputs of the interface, also supply the P digital-to-analog converters, the P outputs of which are connected to a connection matrix 5, thus making it possible to modify the P outputs of the analog converters 4 to form a plurality q of outputs which are connected to the inputs of an analog sound synthesizer 6, the single output of which is connected to a loudspeaker 7.

The synthesizer 6 must have a sufficient number of inputs under tension. It is desirable to have the possibility of controlling at least a first input 61 for producing action on the synthesizer circuit which defines the pitch of the sound, a second input 62 for producing action on the synthesizer circuit which defines the tonal quality of the sound and consequently the number of harmonics contained in the sound, a third input 63 for producing action on the synthesizer circuit which regulates the intensity of the sound, a fourth input 64 for producing action on the synthesizer circuit which regulates the frequency of succession of notes, and a fifth input 65, not shown, for producing action on the synthesizer circuit which regulates the duration of said notes. In the event that the sound synthesizer 6 permits voltage control for special effects, vibrato, distortion, re-echoing, echos, etc., it is possible to provide connections to the inputs for controlling the special effects.

The connection matrix 5 therefore makes it possible, starting from a number P of outputs of the converter 4, to control the q inputs of the synthesizer 6. The matrix 5 may consist of any device which permits the P signals to be combined in order to convert them to Q signals. The connection matrix 5 is within the scope of any one versed in the art; it can simply be constructed by means of plug-in terminals which make it possible to connect the outputs and inputs to each other.

The interface 3 has the primary function of converting the digitized video signal to P signals for use in controlling the synthesizer. One example of selection in the image of P parameters which are representative of its displacement is given in FIG. 2. A frame C represents either the screen of a television set or the viewfinder of a camera which serves to film the image. During each field scan, an object can be defined and represented by its dimensions x, y and by its position X, Y with respect to an origin O chosen in one corner of the frame. The image can be that of a dancer who is moving on a stage and whose movements are represented by the variation in parameters X, Y, y, x. If it is desired to have a larger number of signals for controlling the synthesizer, the signals which are representative of the rate of variation of parameters and even of acceleration are employed. Signals which are representative of the parameters x, y, x', y', x'', y'', X, Y, X', Y', X'', Y'' are thus obtained.

Figure 3:
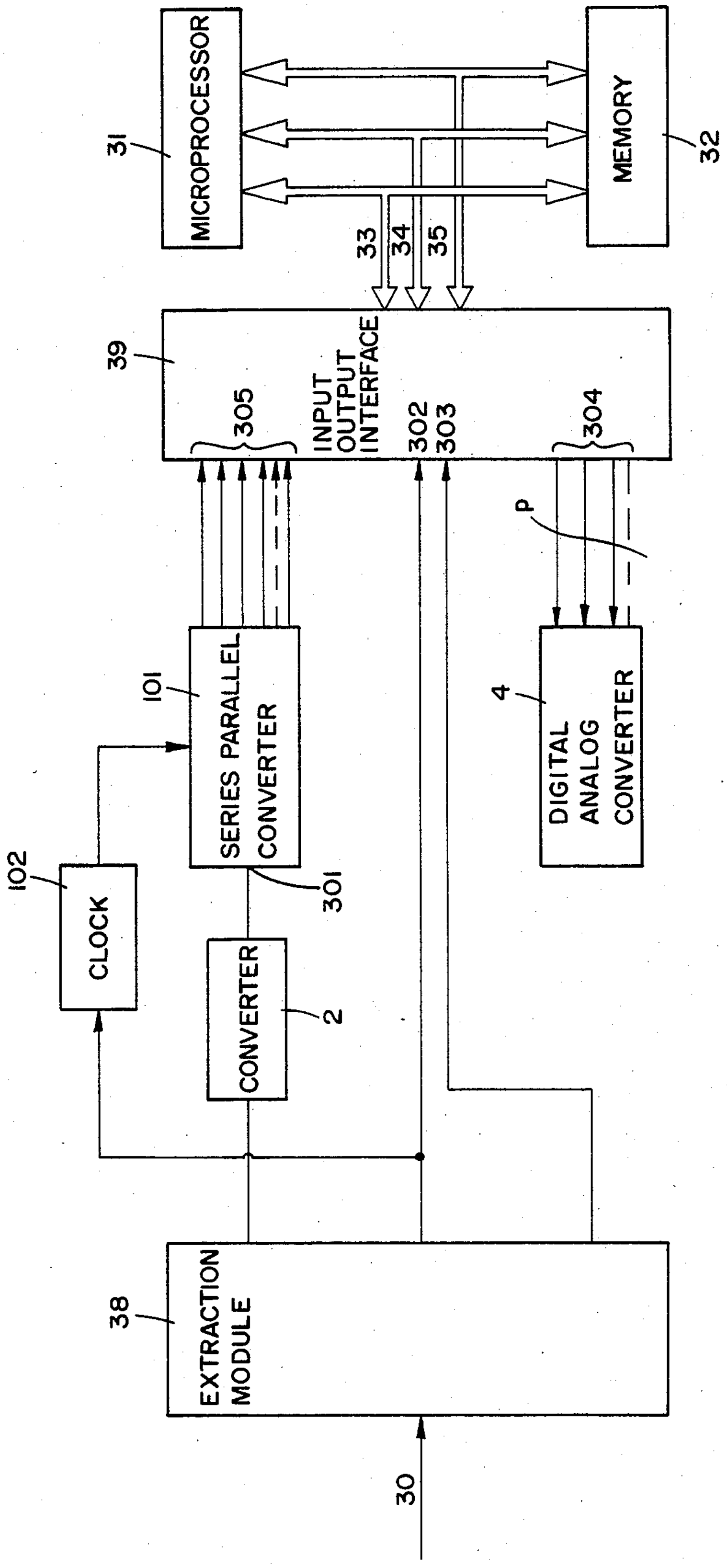
FIG. 3 is a block diagram of an embodiment of means for converting a video signal to a plurality of signals employed in the device of FIG. 1.

An example of construction of an interface in programmed logic is shown in FIG. 3.

An extraction module 38 for the synchronization signals delivers the video signal to be digitized and the line and field synchronization signals. In fact, in the simple case of the example, the converter 2 codes the video signal on a single bit. The output of the analog-to-digital converter 2 is connected to the input 301 of a series-parallel converter 101 controlled by a clock 102 (in turn controlled in dependence on the line synchronization signal) which delivers 16-bit words to the input 305 of the interface 39.

The line and field synchronization signals are connected at 302 and 303 and set the state of the devices of the interface 39 at "1". They make it possible to synchronize the performance of the program with the line and field scans, which is important in order to permit operation of the system in real time. The exchanges between the interface 39 and the microprocessor are either programmed or triggered by switching.

A data bus 33 connects this interface to the microprocessor 31. An address bus 34, as well as a control bus 35, also connect the interface 39 to the microprocessor 31. The microprocessor 31 is also connected via the address bus 34, the data bus 33, the control bus 35, to a memory 32 containing the program for processing digital data which arrive at 305.

At the output, the input-output interface 39 transmits the P words which result from processing of the digitized video signal, via the p outputs 304 to the P digital-to-analog converters 4.

Figure 4:
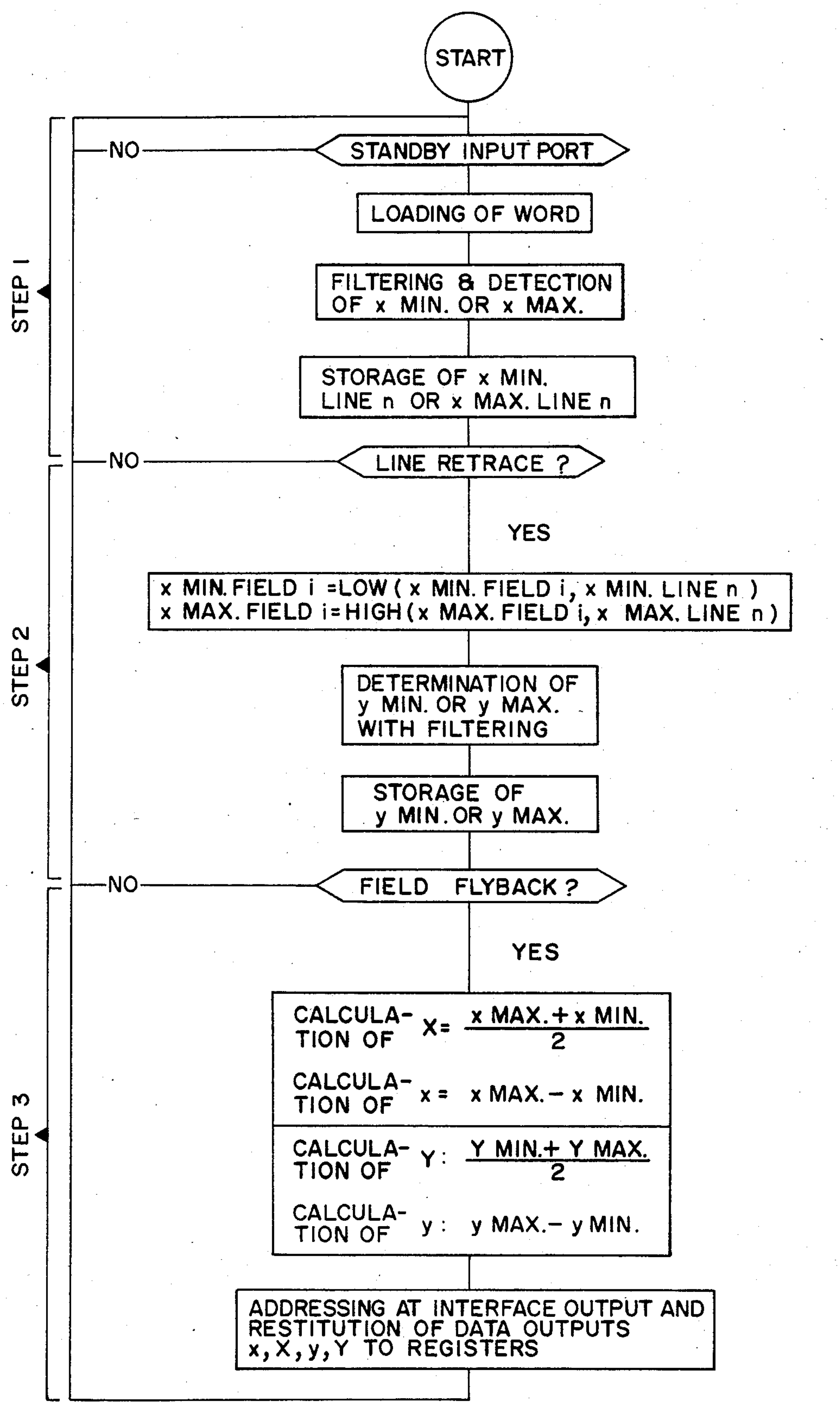
FIG. 4 is a flow diagram of analysis of the image.

During operation, the microprocessor 31 is programmed for operating in the following manner, which will be explained in detail with reference to the flow diagram of FIG. 4.

In a first step, or word-processing step, when the series-parallel converter 101 has loaded sixteen bits corresponding to one complete word, the interface 39 delivers a "complete word" indication and the microprocessor 31 loads the word into an internal register and detects the position of the bits in state "1" in the word after having performed a filtering operation.

The aim of the filtering operation, which is optional, is to secure freedom from parasitic luminances by deciding that a transition from 0 to 1 takes place only after having passed a predetermined number of 1's and that a transition from 1 to 0 takes place only after having passed a predetermined number of 0's (this number will determine the filtering power), which virtually consists in requiring that a transition should have a certain stability before being processed.

If a transition from 0 to 1 or from 1 to 0 has been detected in the word, the microprocessor 31 calculates its position (x min. or x max.), stores this information in memory, searches in the interface 39 the state of the device corresponding to the line synchronization (bit at 1 during the line pulse period) and, if this latter is at 0, awaits the indication relating to the following complete word before repeating the same operation.

On completion of the first step, when all the constituent words of one line have been processed, the microprocessor 31 performs the second step, or line-processing step, by comparing the data x min. and x max. relating to the line n which is processed with the data x min. and x max. which it contains in memory and which result from processing of the preceding line n−1. It retains in memory only the lowest value of the x min. data and the highest value of the x max. data, with the result that, when all the lines have finally been processed, there will remain in memory only the ultimate values in x of the position of the object in the field i (x min. field i, x max. field i).

During this second processing step, the microprocessor 31 also determines whether the rank of the processed line corresponds to Y min. or Y max. after filtering. During this filtering operation, the decision is taken to the effect that a line contains only 1's if a predetermined number of the following lines also contain 1's (y min.). Similarly, the decision to the effect that a line no longer contains 1's is taken only if a predetermined number of lines which follow also contain no 1's (y max.).

The microprocessor 31 then stores in memory the values of y min. and y max. It scans the output of the interface 39 corresponding to the field synchronization signal which enters at 303. If this latter is at 0, it awaits the indication relating to the following complete word before processing a fresh line. If not, it initiates a third step which is a field-processing step.

In this third step, the microprocessor 31 carries out calculations on the data which it contains in memory and which are: x max. field i, x min. field i, y min. field i, y mx. field i.

The microprocessor 31 computes the mean coordinates in abscissae and ordinates, namely:

$$X=(x\text{ max.}+x\text{ min.})/2 \text{ and } Y=(y\text{ max.}+y\text{ min.})/2$$

as well as the width and height of the object, specifically $$x=x\text{ max.}-x\text{ min. and } y=y\text{ max.}-y\text{ min.}$$

When these calculations have been completed, the microprocessor 31 restitutes these data to the four digital-to-analog converters 4 while addressing the outputs 304 of the interface 39 and awaits the indication relating to the following complete word before processing a fresh field i+1.

The only limit to the complexity of programs is the performance time. By way of example, it may be decided that the line should comprise ten words of sixteen bits. By reason of the fact that scanning of one line lasts 52 microseconds, processing of one word must be completed in less than 5.2 microseconds, processing of one line (during a line retrace interval) in less than 12 microseconds, processing of a field (during the field flyback interval) in less than 1.2 milliseconds. These time requirements govern the operation of the system in real time.

Figure 5:
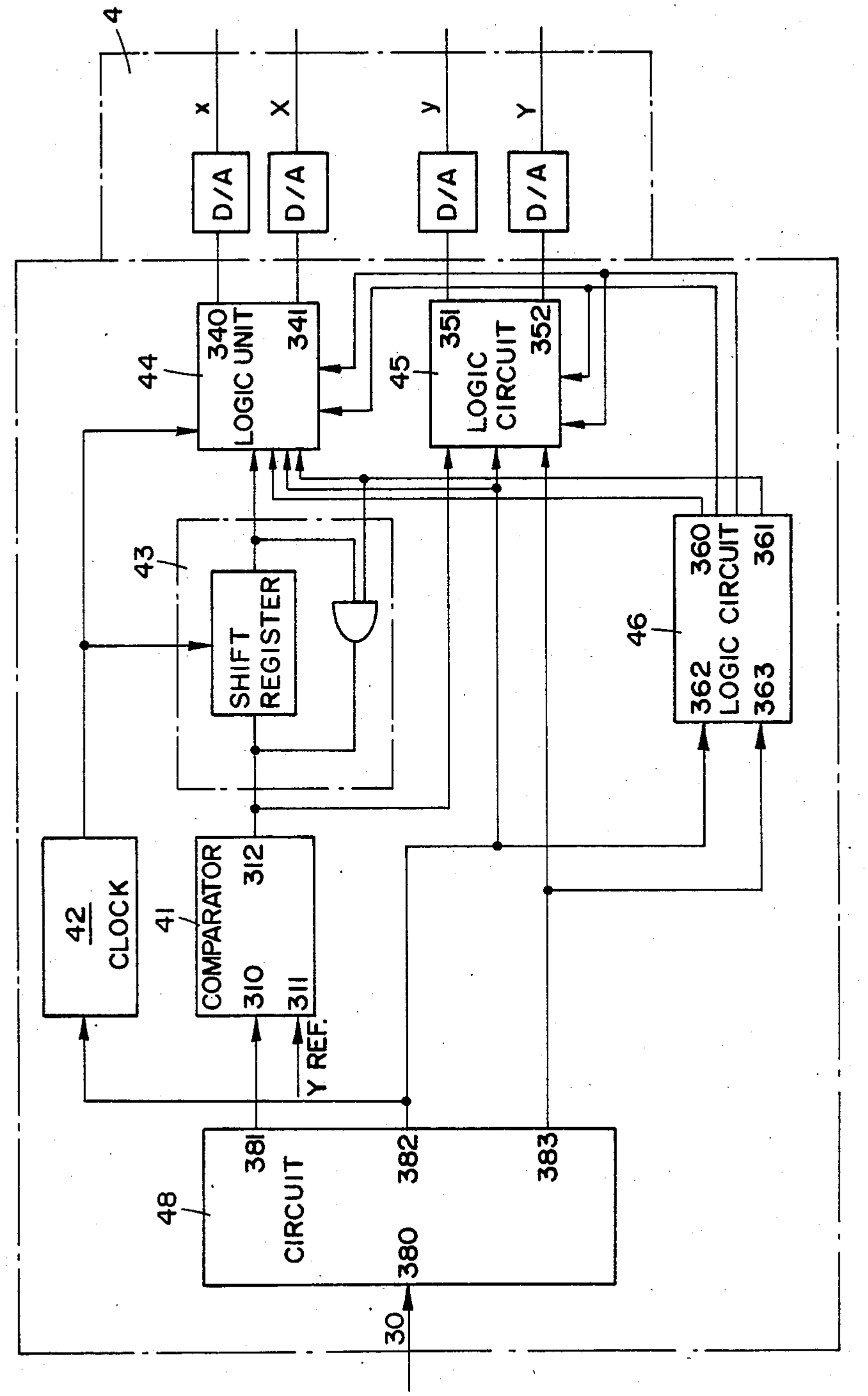
FIG. 5 is a block diagram of a variant of the interface of FIG. 3 as constructed in this case in wired logic.

A second embodiment of the interface 3 in wired logic is illustrated in FIG. 5. The output of the device 1 which delivers a video signal is connected to the input 380 of a circuit 48 for extracting line and field synchronization signals.

The output 382 of the circuit 48 delivers a line synchronization signal which serves to synchronize a clock 42 and which is also connected to one input of a logic circuit 45 having five inputs, the two outputs 351 and 352 of which deliver the signals y and Y, respectively, to the digital-to-analog converters 4. The other four inputs of the logic circuit 45 receive the field synchronization signal delivered at the output 383 of the circuit 48, two of the output signals of a logic circuit 46 and the output signal of the comparator 41, thus making it possible to digitize the video signal received at the input 310 of the circuit 41. The video signal delivered by the output 381 of the circuit 48 is compared with a reference voltage delivered to the input 311 of the comparator circuit 41. By modifying the reference voltage, it is possible to determine the luminance level at which the switching operation takes place.

The logic circuit 45 has the function of detecting the first blank line at the end of object y max. (advantageously with filtering). It constructs a first signal which undergoes a transition to 1 as soon as a non-blank line is encountered and returns to zero at the end of field. It is during the top position of this latter that a counter, not shown, will count the line synchronization pulses, which will provide the value Y.

The logic circuit 45 constructs a second signal which undergoes a transition to 1 as soon as a non-blank line is encountered (as in the case of the preceding signal) and which returns to zero after the end-of-object detection. It is during the top position of this signal that a second counter, not shown, will count the line synchronization pulses, which will provide the value y.

The output 312 of the comparator 41 drives a shift register 43 provided with a feedback loop, the shifting operation of which is synchronized by the signal of the clock 42, which is in turn synchronized with the line synchronization signal. The shift register 43 constitutes a rotating memory which permits the construction and then the storage of the location of the parameter x on one line. The output of the circuit 43 is connected to one input of a logic unit 44 having seven inputs, the six other inputs of which receive the line synchronization signal, the clock signal and the four signals from the outputs of the logic unit 46 which receives the line synchronization signal on its first input 362 and the field synchronization signal on its second input 363.

The logic circuit 46 is constituted by a counter and a demultiplexer. Its intended function is to provide a secondary time base in order to carry out the processing operation which takes place after the field flyback pulse. The circuit 46 thus delivers four logical signals which, together with the line and field synchronization signals, permit sequencing of the operations performed by the system.

The outputs 340 and 341 of the logic circuit 44 deliver the signals which are representative of x and X respectively to the digital-to-analog converters 4. The converters 4 comprise in particular a counter and buffers.

Figure 2:
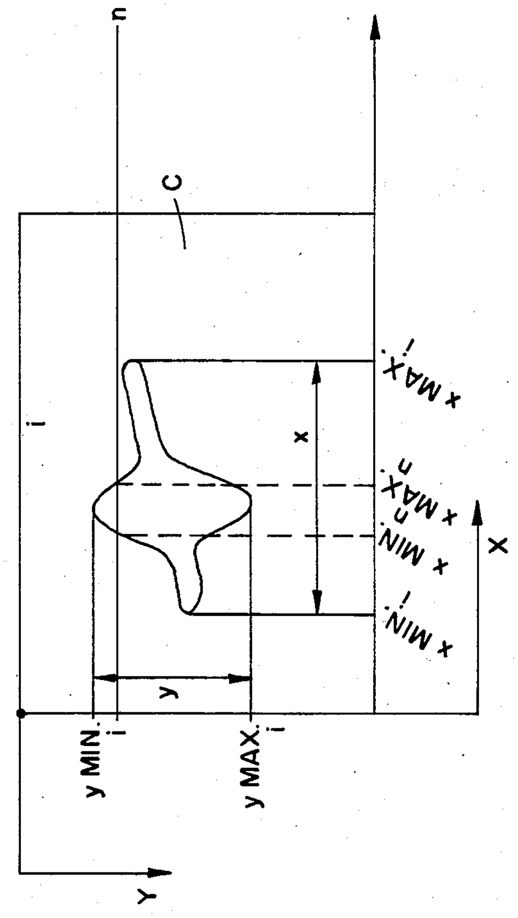
FIG. 2 is an example of parameters which can be extracted from an image for utilization in the device of the invention.

It will be noted that, in the variant of FIG. 5, the values X and Y designate respectively the abscissae and ordinates at the start of the object in projection on each axis and not the mid-points between minimum and maximum as in the previous case which is also illustrated in FIG. 2.

It is wholly apparent that any modification within the capacity of anyone versed in the art also comes within the spirit of the invention. It thus follows in particular that, when referring to an object in the foregoing, consideration could also be given to a number of separate and distinct sub-objects moving more or less independently with respect to each other. Such objects could also be distinguished from each other by their color. Furthermore, the same technique can serve to carry out an automatic sound recording on a video film.

It must also be understood that, in the case of a sound production which is delayed with respect to observation of the image, both the sound control signals and the image signals or the corresponding parameters can be just as readily retained in recordings performed either in analog form or in digital form. Both the synthesized sounds themselves and the image to be analyzed can be maintained in the recorded state in all the details which define them.

What is claimed is:

1. A method of sound production, said method comprising the steps of observing an image which includes a moving object;

producing image signals representing at least two different parameters, each parameter having a variation corresponding to one of the position, the volume and the displacement of the object, the variation of the volume of the object, the rate of variation of the displacement and of the volume of the object;

producing sound control signals from said image signals; and achieving sound synthesis by utilizing said sound control signals for controlling the variations of at least two different parameters of the sounds produced.

2. A method of sound production as claimed in claim 1, wherein said image signals representing at least two parameters of the image correspond to the volume and the position of the object and are obtained in three steps, a first step of which involves processing of the video signal in order to extract therefrom in respect of each line the value of minimum abscissa and of maximum abscissa defining the contour of the object, a second step of which takes place during flyback, making it possible by comparing the minimum abscissae of each line and the maximum abscissae of each line to determine the lowest of the minimum abscissae and the highest of the maximum abscissae, and making it possible by determining the ordinates of the first line and of the last line in which an abscissa has been detected to detect respectively the values of the maximum ordinate and of the minimum ordinate, and a third step during which there are determined the coordinates of the midpoint of the object and the dimensions in abscissa and in ordinates of the object, these results being addressed to digital-to-analog converters connected to the inputs of a sound synthesizer for producing the sounds.

3. A sound production device, comprising
first means for observing an image which includes a moving object and producing image signals representing at least two different parameters, each parameter having a variation corresponding to one of the position, the volume and the displacement of the object, the variation of the volume of the object, the rate of variation of the displacement and of the volume of the object; and
second means for producing sound control signals from said image signals and for achieving sound synthesis by utilizing said sound control signals for controlling the variations of at least two different parameters of the sounds produced.

4. A sound production device as claimed in claim 3, wherein said first means comprise a video signal generator for producing said signals.

5. A method of sound production, said method comprising the steps of
observing an image which includes a moving object;
producing image signals representing at least two parameters of the image which vary during displacement of the object;
producing sound control signals from said image signals; and
achieving sound synthesis by utilizing said sound control signals for controlling the variations of at least two different parameters of the sounds produced, said image signals representing at least two parameters of the image which vary during displacement of the object wherein said image signals are obtained in three steps, a first step of which involves processing of the video signal in order to extract therefrom in respect of each line the value of minimum abscissa and of maximum abscissa defining the contour of the object, a second step of which takes place during flyback, making it possible by comparing the minimum abscissae of each line and the maximum abscissae of each line to determine the lowest of the minimum abscissae and the highest of the maximum abscissae, and making it possible by determining the ordinates of the first line and of the last line in which an abscissa has been detected to detect respectively the values of the maximum ordinate and of the minimum ordinate, and a third step during which there are determined the coordinates of the mid-point of the object and the dimensions in abscissae and in ordinates of the object, these results being addressed to digital-to-analog converters connected to the inputs of a sound synthesizer for producing the sounds.

6. A method as claimed in claim 5, wherein said image signals comprise signals representative of each of the position of the object with respect to a reference point in the image, the speed of displacement of the object with respect to the reference point, the volume of the object, and the rate of variation in volume of the object.

7. A method of sound production, said method comprising the steps of
observing an image which includes a moving object;
producing image signals representing at least two parameters of the image which vary independently during displacement of the object;
producing sound control signals from said image signals; and
achieving sound synthesis by utilizing said sound control signals for controlling the variations of at least two different parameters of the sounds produced, said image signals being each representative of one of the position of the object with respect to a reference point in the image, the speed of displacement of the object with respect to the reference point, the volume of the object, and the rate of variation in volume of the object.

8. A method as claimed in claim 7, wherein said image signals additionally comprise signals representative of the acceleration of the object and the acceleration of the variation in volume of the object.

9. A method as claimed in claim 8, wherein the parameters of the sounds are chosen from the pitch of the sound, its tonal quality, its intensity, the frequency of succession of sounds, and the duration of the sounds.

10. A sound production device, comprising
first means for observing an image which includes a moving object and producing image signals representing at least two parameters of the image which vary independently during displacement of the object; and
second means for producing sound control signals from said image signals and for achieving sound synthesis by utilizing said sound control signals for controlling the variations of at least two different parameters of the sounds produced, said image signals being each comprising signals representative of one of the position of the object with respect to a reference point in the image, the speed of displacement of the object with respect to the reference point, the volume of the object, and the rate of variation in volume of the object.

11. A sound production device, comprising
first means comprising a video signal generator for observing an image which includes a moving object and producing image signals representing at least two parameters of the image which vary independently during displacement of the object; and
second means for producing sound control signals from said image signals and for achieving sound synthesis by utilizing said sound control signals for controlling the variations of at least two different parameters of the sounds produced, said image signals being comprising signals representative of one of the position of the object with respect to a reference point in the image, the speed of displacement of the object with respect to the reference point, the volume of the object, and the rate of variation in volume of the object.

* * * * *